United States Patent [19]
Fukumoto et al.

[11] Patent Number: 6,147,151
[45] Date of Patent: Nov. 14, 2000

[54] TREAD RUBBER COMPOSITION AND TIRE USING THE COMPOSITION

[75] Inventors: Takahiro Fukumoto; Yoko Nakada, both of Kobe; Yoichi Mizuno, Akashi; Kazuo Kadomaru, Kobe, all of Japan

[73] Assignee: Sumitomo Rubber Industries Limited, Hyogo, Japan

[21] Appl. No.: 08/345,826

[22] Filed: Nov. 21, 1994

[30] Foreign Application Priority Data

| Nov. 26, 1993 | [JP] | Japan | 5-296913 |
| Jul. 21, 1994 | [JP] | Japan | 6-169820 |
| Oct. 24, 1994 | [JP] | Japan | 6-258469 |

[51] Int. Cl.$^7$ .............................. C08K 3/34; C08K 9/06; B60C 11/00
[52] U.S. Cl. ..................... 524/447; 524/445; 524/261; 524/262; 524/264; 524/265; 523/212; 523/213; 152/209.4
[58] Field of Search .................... 524/447, 445, 524/261, 262, 264, 265; 523/212, 213; 152/209 R

[56] References Cited

U.S. PATENT DOCUMENTS

| 4,315,844 | 2/1982 | Aboytes | 524/447 |
| 4,522,970 | 6/1985 | Scriver et al. | 524/447 |
| 4,810,578 | 3/1989 | Prescott et al. | 428/405 |
| 4,968,728 | 11/1990 | Wason | 524/447 |
| 5,162,409 | 11/1992 | Mroczkowski | 524/262 |
| 5,244,958 | 9/1993 | Goodman | 524/477 |

FOREIGN PATENT DOCUMENTS

| 60-139728 | 7/1985 | Japan. |
| 5-179069 | 7/1993 | Japan. |

OTHER PUBLICATIONS

Journal of Applied Polymer Science, vol. 28, No. 2, Feb. 1983, New York, US, pp. 659–683.

*Primary Examiner*—James J. Seidleck
*Assistant Examiner*—Olga Asinovsky
*Attorney, Agent, or Firm*—Birch, Stewart, Kolasch & Birch, LLP

[57] ABSTRACT

A tread rubber composition of excellent hydrophobic property and water repellency suitable to a studless tire of excellent performance on ice, comprising a diene rubber comprising at least one rubber selected from the group consisting of natural rubber, isoprene and polybutadiene as a main ingredient and, based on 100 parts by weight of the diene rubber, from 10 to 40 parts by weight of a clay comprising kaolinite as a main ingredient and having an oil absorption amount of from 50 to 70 g/100 g and 0.1 to 8 parts by weight of a silane coupling agent.

18 Claims, 1 Drawing Sheet

TREAD RUBBER COMPOSITION AND TIRE USING THE COMPOSITION

BACKGROUND OF THE INVENTION

Field of the Invention and Related Statement

The present invention concerns a tread rubber composition having excellent performance on ice and suitable to a studless tire, as well as a tire having a tread manufactured by using the rubber composition.

A spiked tire exhibits an excellent gripping force frozen road surface. Since the spiked tire has a large digging friction force, among hysteresis loss friction, adhesion friction and digging friction related to the gripping force between a tread rubber and a road surface, it exhibits an excellent gripping force on the frozen road surface.

However, use of the spiked tire has gradually been restricted legally as a countermeasure for public pollution caused by powdery dusts in recent years, and a studless tire with no spikes has been rapidly popularized. In some studless tires, the digging friction force is improved, for example, by incorporating a blowing agent or organic fibers therein thus increasing the unevenness on the surface of the tread. However, since the studless tire has lower digging friction force as compared with the spiked tire, its gripping force is still inferior to that of the spiked tire. In particular, if the road surface is ground flat by idle rotation of a tire upon starting on the frozen road surface, the gripping force of the studless tire is even more deteriorated, so that a further improvement has been demanded.

On a road surface with extremely low friction coefficient, such as a frozen road surface, the hysteresis loss friction is extremely small but adhesion friction (tract) also contributes to improvement of the gripping force, in addition to the digging friction. Therefore, it has been devised to increase the gripping force on the frozen road surface for the studless tire by increasing the other of the frictions contributing to the gripping force, that is, the tract.

As a method of improving the gripping force on the frozen road surface, there is a method of improving the tract by eliminating hydroplanes caused by thawing of the frozen road surface due to friction upon starting and braking, thereby increasing the area of contact between a tread rubber and an icy surface, or by making the rubber material softer to increase the area of contact with the road surface.

Increased unevenness on the tread surface can increase the digging friction, as well as can take up peripheral water into concave portions to eliminate hydroplanes. However, increase of the concave portions for the elimination of hydroplanning leads to a decrease in the area of contact with the icy surface, which is contrary to the improvement of the gripping force based on the increase in the area of contact, so that the effect is limited.

On the other hand, U.S. Pat. No. 4,522,970 discloses that a tread composition incorporating kaolinite clay and 3,3'-bis(trimethoxysilyl propyl)polysulfide in a certain rubber ingredient can improve wet skid resistance. However, tread rubbers for use in a studless tire in disclosed examples have an insufficient performance on ice. In addition, blending of the clay generally deteriorates the reinforcing performance of the rubber, and the rubber ingredient (butadiene and SBR) used for the tire in the disclosed examples shows large amounts of wear, which is not suitable for a tread rubber.

SUMMARY OF THE INVENTION

An object of the invention is to provide a tread rubber composition based on a diene rubber ingredient used customarily, and capable of improving the performance on ice within such a range as causing no problem in view of the reinforcing performance of a tread rubber, by improving the tract force by the elimination of hydroplanning and increase in the area of contact with a road surface.

The present inventors have developed a rubber composition of excellent hydrophobic property and water repellent property, in order to increase the area of contact between a tire and a road surface by reducing water-deposition on the surface of the tread and have accomplished the present invention.

Specifically, the tread rubber composition according to the present invention comprises a diene rubber comprising at least one rubber selected from the group consisting of natural rubber, polyisoprene and polybutadiene as a main ingredient and, based on 100 parts by weight of the diene rubber, 10 to 40 parts by weight of clay comprising kaolinite as a main clay ingredient and having an oil absorption amount of from 50 to 70 g/100 g and from 0.1 to 8 parts by weight of a silane coupling agent.

For a polymer, as a rubber ingredient in the tread rubber composition according to present invention, a diene rubber having a low glass transition point (Tg) and less curing even at a low temperature, specifically, natural rubber, polyisoprene or polybutadiene is used so as to ensure an area of contact even with a frozen road surface. The natural rubber, polyisoprene and polybutadiene may be used alone or in combination of two or more of them. If necessary, another diene polymer such as SBR may also be added.

In the tread rubber according to the present invention, a clay comprising kaolinite as a main clay ingredient and having an oil absorption amount of 50 to 70 g/100 g of the clay (hereinafter represented as a oil absorption amount of 50 g/100 g to 70 g/100 g) is blended, in order to eliminate hydroplanning between a tire surface and a road surface. The oil absorption amount used herein means an amount of oil absorbed into clay when the clay is immersed in the oil for a certain period of time, which is an indication of the state of a structure. If the oil absorption amount of the clay is less than 50 g/100 g, the reinforcing performance is insufficient when it is applied to the tread, tending to cause chipping or early wearing of the tread. On the other hand, if the oil absorption amount of the clay is more than 70 g/100 g, the size of clay coagulates is excessively small, in other words, the clay is in the form of a fine powder, making it impossible for pelletization and making handling difficult. Hard clay (oil absorption amount of about 20 g/100 to 40 g/100 g) has generally been known as a clay to be blended with the tire rubber composition. However, if the hard clay is applied to a tread rubber for a studless tire, it shows less improving effect for the performance on ice and snow and tends to cause insufficient reinforcing performance. Reduction of the rubber reinforcing performance Is not desirable since this causes deterioration of the wear resistance and deterioration of failure characteristics of the tire tread.

Any of clays capable of satisfying the foregoing requirements may be used in the present invention and clays sintered at 600° C. to 800° C. are preferred. Clays comprising kaolinite as the main ingredient sometimes have their hydro philic groups exposed on the surface or contain structured water in crystals. Then, when they are sintered at 600° C. to 800° C., they release the structured water to improve the hydrophobic property and contribute to the improvement of the water repellency of the tread rubber. Sintering at a temperature lower than 600° C. makes it difficult to release the structured water in the crystals and, on the other hand, sintering at a temperature higher than 800° C. tends to change the crystal structure of kaolinite. For further improving the water repellency of the clay, it is preferred to treat the clay with a silane coupling agent after sintering.

The content of the clay is from 10 to 40 parts by weight, preferably, from 10 to 30 parts by weight based on 100 parts by weight of the rubber ingredient. If the blending amount of the clay is more than 40 parts by weight, the reinforcing performance is deteriorated, particularly, at a low temperature, which is not preferred. On the other hand, if the blending amount of the clay is less than 10 parts by weight, no substantial improvement in the present invention for the gripping force on the frozen road surface is obtained.

Since the reinforcing performance of the rubber composition generally tends to be deteriorated by the blending of the clay, it is preferred to further blend a reinforcing agent such as a carbon black or silica in the rubber composition for use in the tread according to the present invention. In this case, the content of the clay is preferably from 15 to 80% by weight based on the total amount of the content of the reinforcing agent such as carbon black (total amount of the reinforcing agent) and the blending amount of the clay. The total amount of the reinforcing agent is preferably from 50 to 90 parts by weight based on 100 parts by weight of the rubber ingredient.

In the tread rubber composition according to the present invention, it is preferred to add a silane coupling agent for further improving the water repellency. Silane coupling agents which can be used preferably are represented by the formula $X_3SiR$ in which X represents an alkoxy group or a chlorine atom, R represents one of vinyl, glycide, methacryl, amino, mercapto, epoxy and imide groups, or represented by the formula:

$$(C_nH_{2n+1}O)_3\text{—Si—}(CH_2)_m\text{—}S_k\text{—}(CH_2)_m\text{—Si}(C_nH_{2n+1})O_2$$

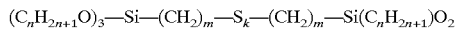

in which n represents an integer of 1 to 4, and m and k each represents an integer of 1 to 6. Such a silane coupling agent forms a chemical bond with organic and inorganic materials in the rubber composition respectively to combine the organic and inorganic materials at the boundary. The blending amount of the silane coupling agent is from 0.1 to 8 parts by weight, preferably, 0.1 to 5 parts by weight based on 100 parts by weight of the rubber in the rubber composition. If it is less than 0.1 parts by weight, no substantial effect can be obtained, whereas if it is more than 8 parts by weight, material cost will be increased.

The silane coupling agent may be added alone in the composition, or it may be added as a clay treating gent. Addition as the clay treating agent is more effective. Namely, if the clay is previously treated with the silane coupling agent and then blended into the rubber composition, the hydrophobic property and the water repellency of the clay can act by way of the silane coupling agent, so that hydrophobic moieties can be converted into portions having the hydrophobic property in the rubber composition (not only the rubber ingredient but also the blending agents described later), to provide the tread rubber itself with the water repellency. When the tread rubber itself is provided with the water repellency, hydroplanning between ice and the tread rubber can be suppressed and water droplets deposited at the surface of the tread rubber can be removed easily. As a result, a substantial area of contact between the tread rubber and the ice is increased to increase the tract. That is, the gripping force on the iced road surface is improved.

The rubber composition according to the present invention may further contain, in addition to the compounds described above, other customary blending agents used in rubber industry such as vulcanizer, vulcanization promoter, vulcanization promotion aid, aging inhibitor and softening agent. Further, in order to improve the hydroplane eliminating effect or digging friction to the road surface, organic fibers may be incorporated or a blowing agent may be added to cause blowing upon manufacture of the tire.

As has been described above, in the tread rubber composition according to the present invention, since a predetermined amount of the clay having the oil absorption amount within a predetermined range is blended together with the silane coupling agent, it has the water repellency and the hydrophobic property with no substantial deterioration of the reinforcing performance. In particular, when the clay is previously treated with the silane coupling agent and then blended, since the hydrophobic property of the tread rubber itself can be improved, it can contribute to the improvement of the area of contact with the icy road surface to increase the tract and shows excellent performance on ice. Further, when the clay sintered at about 600° C. is used, it can exhibit the water repellency and the hydrophobic property effectively. Further, when a reinforcing agent such as carbon black is blended in a predetermined amount, deterioration of failure characteristics can be suppressed.

Accordingly, the tread rubber composition according to the present invention is most suitable to a tread rubber composition for use in a studless tire to which a demand for the failure characteristics and wear resistance is not so severe but a demand for the braking performance on ice and snow is severe. Then, the tire having the tread manufactured by using the tread rubber composition according to the present invention has excellent performance on ice.

DESCRIPTION OF THE PREFERRED EMBODIMENTS

Figure 1:
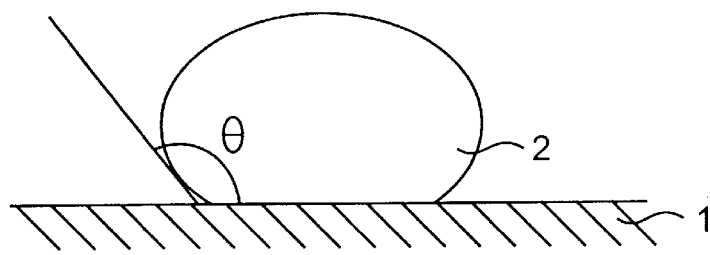
FIG. 1 is an explanatory view for an angle of contact.

The present invention will be explained more specifically with reference to preferred embodiments.

Rubber compositions of Examples 1 to 5 and Comparative Examples 1 to 6 were prepared by blending polymers and various kinds of additives shown in Table 1 and further blending various kinds of blending agents (clay mainly composed of kaolinite, carbon black and silane coupling agent) each in by an amount shown in Table 2.

As the polybutadiene shown in Table 1, UBEPOLE BR 150L (trade name of products manufactured by Ube Industries Ltd.) was used. OZONON 6C (N-phenyl-N-(1,3-dimethylethyl)-p-phenylene diamine) manufactured by Seko Kagaku Co. was used as an aging inhibitor. NOC-SELLER NS(N-tert-butyl-2-benzothiazyl sulfeneamide) manufactured by Ohuchi Shinko Kagaku Co. was used as a vulcanization promoter.

As the carbon black shown in Table 2, SHOWBLACK N 220 manufactured by Showa Cabot Co. was used. Three types of clays A, B and C were used as the clay. Both of clays A and B are amorphous meta-kaolin sintered at 600° C. and having the oil absorption amount of 55 g/100 g. Clay C is referred to as a hard clay having an oil absorption amount of 40 g/100 g. Both of clay B and clay C were treated with a silane coupling agent of vinyl-tri(t-methoxyethoxy) silane and contained 1% by weight of the silane coupling agent. In Example 6 and Comparative Example 2, Si69 manufactured by DEGUSSA Co. was added as the silane coupling agent. Si69 is bis(triethoxysilylpropyl)tetra-sulfene. In the preparation of the rubber compositions, a process oil was blended by an amount shown in Table 2 for making the hardness of the compositions equal to each other in each of the examples and the comparative examples.

Vulcanized rubber test pieces were prepared by using the thus prepared rubber compositions, and the failure characteristics and the angle of contact with water were evaluated by the following methods. Further, studless tires of 165R13 were manufactured by using the rubber compositions described above and the performance on ice of the tires was evaluated by the following method. The results are shown together in Table 2.

TABLE 1

|  | Blending amount (parts by weight) |
|---|---|
| Natural rubber | 70 |
| Polybutadiene | 30 |
| Stearic acid | 3 |
| Zinc powder | 3 |
| Aging inhibitor | 1 |
| Sulfur | 1.5 |
| Vulcanization promoter | 0.5 |

Evaluation Method
Failure Characteristics

Rubber tearing strength was measured according to JIS K6301. Assuming the measured value as 100 for the tearing strength of a rubber composition not containing clay and silane coupling agent (Comparative Example 1), measured values for the tearing strength of other rubber compositions were represented each by an index. A small index value shows lower failure characteristics. Since a demand for the failure characteristics on ice and snow road surface is not so severe as compared with that on usual road surface, there is no practical problem as the tread for the studless tire so long as the failure characteristics exceed about 80.

Performance on Ice

Studless tires of 165R13 (inner pressure: 2 kgf/cm$^2$) were manufactured by using the rubber compositions described above and the tires were mounted to a 1500 cc front wheel driven (FF) anti-lock braking system (ABS) car and measured under the following conditions:

Place of measurement:
  Nayoro test course of Sumitomo
  Rubber Industries, Ltd.
  (Iced surface road)
Atmospheric temperature: −6.5° C.
Ice temperature: −4.0° C.

In the measurement, the car was caused to run at a speed of 30 km/h and then braked rapidly to determine a distance from the instance the wheels were locked till stopping of the car. Assuming the stopping distance in Comparative Example 1 as 100, stopping distances measured for other examples and comparative examples were indicated each by an index. As the index value is smaller, it shows better performance on ice.

Angle of Contact

The angle of contact means an angle θ formed at a boundary at which rubber 1 and water droplet 2 are in contact with each other in a state where the droplet 2 is deposited to the surface of the rubber 1. This represents the wettability of water to rubber. As the angle of contact is larger, the tire is less wettable and the water repellency of the rubber is excellent.

Figure 2:
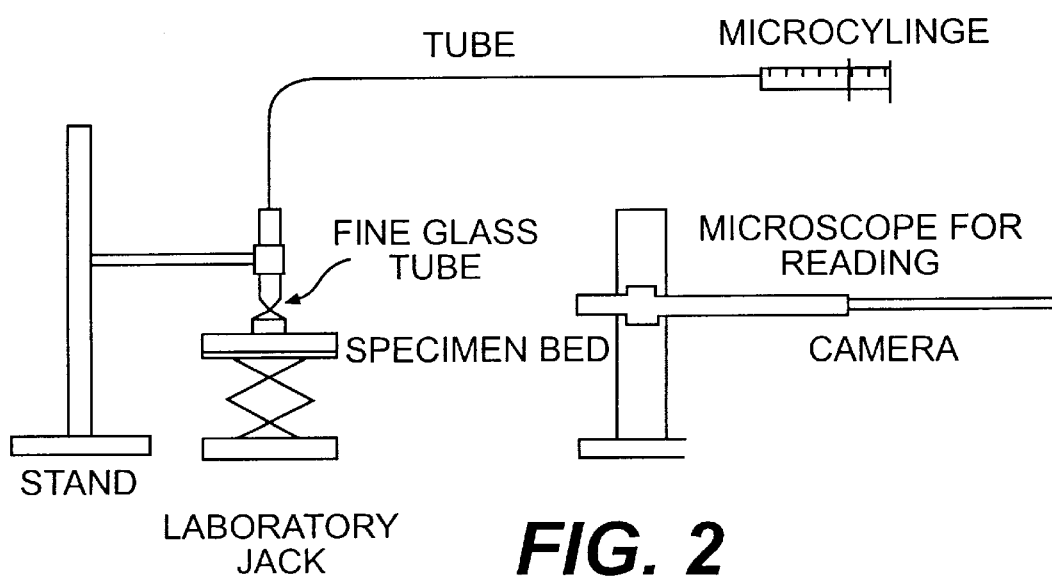
FIG. 2 is a view illustrating a system used for measuring the angle of contact.

Using the system shown in FIG. 2, cosine for the angle of contact was measured for forwarding and backwarding movement to determine the angle of contact according to the following equation:

$$\theta = \cos^{-1}(\tfrac{1}{2} \times (\cos\theta a + \cos\theta r))$$

in which θa is an angle of contact upon forwarding and θr represents an angle of contact upon backwarding.

Assuming the value for the angle θ in Comparative Example 1 as 100, angles θ for other examples and comparative examples were represented each by an index. As the index value is greater, the angle of contact is larger (more blunt angle).

TABLE 2

|  | Example | | | | | Comparative example | | | | | |
|---|---|---|---|---|---|---|---|---|---|---|---|
|  | 1 | 2 | 3 | 4 | 5 | 1 | 2 | 3 | 4 | 5 | 6 |
| Process oil | 0 | 4 | 8 | 12 | 6 | 0 | 0 | 2 | 16 | 8 | 4 |
| Carbon black (parts by weight) | 50 | 50 | 50 | 50 | 50 | 55 | 10 | 50 | 50 | 50 | 50 |
| Silane coupling agent (parts by weight) | 0.1 | 0.2 | 0.3 | 0.4 | 2 | — | 8 | 0.05 | 0.5 | 0 | 0 |
| Clay |  |  |  |  |  |  |  |  |  |  |  |
| Clay A (parts by weight) | — | — | — | — | 30 | — | 80 | — | — | 30 | — |
| Clay B (parts by weight) | 10 | 20 | 30 | 40 | — | — | — | 5 | 50 | — | — |
| Clay C (parts by weight) | — | — | — | — | — | — | — | — | — | — | — |
| Clay content (wt %) | 17 | 29 | 38 | 44 | 38 | — | 89 | 9 | 50 | 38 | 29 |
| Evaluation |  |  |  |  |  |  |  |  |  |  |  |
| Performance on ice | 96 | 92 | 90 | 88 | 92 | 100 | 86 | 100 | 87 | 95 | 102 |
| Failure characteristics | 97 | 94 | 89 | 81 | 92 | 100 | 54 | 99 | 70 | 80 | 85 |
| Angle of contact | 102 | 105 | 108 | 110 | 103 | 100 | 116 | 100 | 113 | 104 | 98 |

Evaluation

As can be seen from Table 2, rubber compositions in which clay A or clay B each having the oil absorption amount within the range of the present invention were blended by more than 10 parts by weight (examples and Comparative Examples 2, 4, 5) had excellent performance on ice as compared with a rubber composition in which the clay was not blended at all (Comparative Example 1) or the clay was blended only by an insufficient amount (Comparative Example 3) or, a rubber composition in which the clay C blended therewith had the oil absorption amount out of the range of the present invention (Comparative Example 6). On the other hand, the failure characteristics tend to be deteriorated by the blend of the clay. The deterioration of the failure characteristics could be kept within a practically allowable range at the blending amount of the clay of less than 40 parts by weight (examples), whereas the failed characteristics were reduced excessively in the rubber composition at the blending amount of the clay of more than 40 parts by weight (Comparative Examples 2, 4). Particularly, if the blending amount of the carbon black as the reinforcing agent was insufficient, deterioration of the failure characteristics was inevitable even if a great amount of silane coupling agent was blended (Comparative Example 2). Further, even if a clay having the oil absorption amount within the range of the present invention was blended by an amount within the range of the present invention, if the silane coupling agent was not blended in the rubber composition (Comparative Example 5), a problem resulted in the failure characteristics from a practical point of view. Accordingly, the performance on ice can be improved while keeping the failure characteristics within a practically allowable range by blending a clay having the oil absorption amount within the predetermined range in an amount within the predetermined range. Further, it can be seen that blend of the carbon black by more than 50% by weight is preferred for ensuring failure characteisics with safety.

Further, it can be seen from comparison between Example 3 and Example 5 that the performance on ice can be improved more by blending the silane coupling agent not alone but in a state used for the treatment of the clay.

Further, it can be seen in Examples 1–5 that the angle of contact is increased in proportion with the blending amount of the clay treated with the silane coupling agent to improve the performance on ice. It can thus be seen that the silane coupling agent bonded with the clay by previously treating the clay acts on the hydrophilic portion in the rubber composition together with the clay to effectively improve the water repellency of the tread rubber. Furthermore, it can also be seen from comparison between Example 5 and Comparative Example 5 that blending of the silane coupling agent contributes not only to the improvement of the failure characteristics together with the clay but also to the improvement of the performance on ice by the synergistic effect with the clay.

What is claimed is:

1. A tread rubber composition comprising a diene rubber comprising at least one rubber selected from the group consisting of natural rubber, polyisoprene and polybutadiene as a main ingredient and, based on 100 parts by weight of said diene rubber, from 10 to 40 parts by weight of a clay comprising kaolinite as a main ingredient and having an oil absorption amount of from 50 to 70 g/100 g and from 0.1 to 8 parts by weight of a silane coupling agent, wherein said clay is sintered at a temperature from 600 to 800° C., and said silane coupling agent is incorporated in a state previously used for treating the clay.

2. A tread rubber composition as defined in claim 1, wherein the clay is amorphous meta-kaolin.

3. A tread rubber composition as defined in claim 1, further comprising 50 to 90 parts by weight of a reinforcing agent.

4. A tread rubber composition as defined in claim 2, further comprising 50 to 90 parts by weight of a reinforcing agent.

5. A tread rubber composition as defined in claim 3, wherein the reinforcing agent comprises at least one material selected from the group consisting of carbon black and silica.

6. A tread rubber composition as defined in claim 4, wherein the reinforcing agent comprises at least one material selected from the group consisting of carbon black and silica.

7. A tread rubber composition as defined in claim 1, wherein the silane coupling agent is represented by the formula: $X_3SiR$ in which X represents an alkoxy group or a chlorine atom, R represents one of vinyl, glycide, methacryl, amino, mercapto, epoxy and imide groups, or represented by the formula:

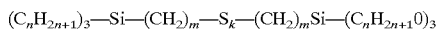

in which n represents an integer of 1 to 4, and m and k each represents an integer of 1 to 8.

8. A tread rubber composition as defined in claim 3, wherein the silane coupling agent is represented by the formula: $X_3SiR$ in which X represents an alkoxy group or a chlorine atom, R represents one of vinyl, glycide, methacryl, amino, mercapto, epoxy and imide groups, or represented by the formula:

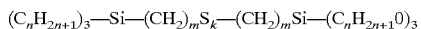

in which n represents an integer of 1 to 4, and m and k each represents an integer of 1 to 8.

9. A tread rubber composition as defined in claim 4, wherein the silane coupling agent is represented by the formula: $X_3SiR$ in which X represents an alkoxy group or a chlorine atom, R represents one of vinyl, glycide, methacryl, amino, mercapto, epoxy and imide groups, or represented by the formula:

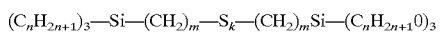

in which n represents an integer of 1 to 4, and m and k each represents an integer of 1 to 8.

10. A studless tire for an icy road surface, comprising a tread having water repellency formed from a tread rubber composition comprising a diene rubber comprising at least one rubber selected from the group consisting of natural rubber, polyisoprene and polybutadiene as a main ingredient and, based on 100 pars by weight of said diene rubber, from 10 to 40 parts by weight of a clay comprising kaolinite as a main ingredient and having an oil absorption amount of from 50 to 70 g/100 g and from 0.1 to 8 parts by weight of a silane coupling agent, wherein said clay is sintered at a temperature from 600 to 800° C., and said silane coupling agent is incorporated in a state previously used for treating the clay.

11. A studless tire as defined in claim 10, wherein the clay is amorphous meta-kaolin.

12. A studless tire as defined in claim 10, wherein the rubber composition further comprises 50 to 90 parts by weight of a reinforcing agent.

13. A studless tire as defined in claim 11, wherein the rubber composition further comprises 50 to 90 parts by weight of a reinforcing agent.

14. A studless tire as defined in claim 12, wherein the reinforcing agent comprises at least one material selected from the group consisting of carbon black and silica.

15. A studless tire as defined in claim 13, wherein the reinforcing agent comprises at least one material selected from the group consisting of carbon black and silica.

16. A studless tire as defined in claim 10, wherein the silane coupling agent is represented by the formula: $X_3SiR$ in which X represents an alkoxy group or a chlorine atom, R represents one of vinyl, glycide, methacryl, amino, mercapto, epoxy and imide groups, or represented by the formula:

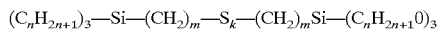

in which n represents an integer of 1 to 4, and m and k each represents an integer of 1 to 8.

17. A studless tire as defined in claim 12, wherein the silane coupling agent is represented by the formula: $X_3SiR$ in which X represents an alkoxy group or a chlorine atom, R represents one of vinyl, glycide, methacryl, amino, mercapto, epoxy and imide groups, or represented by the formula:

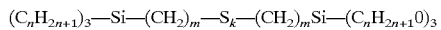

in which n represents an integer of 1 to 4, and m and k each represents an integer of 1 to 8.

18. A studless tire as defined in claim 13, herein the silane coupling agent is represented by the formula: $X_3SiR$ in which X represents an alkoxy group or a chlorine atom, R represents one of vinyl, glycide, methacryl, amino, mercapto, epoxy and imide groups, or represented by the formula:

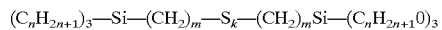

in which n represents an integer of 1 to 4, and m and k each represents an integer of 1 to 8.

* * * * *